(12) United States Patent
Ahern

(10) Patent No.: US 7,976,076 B1
(45) Date of Patent: Jul. 12, 2011

(54) TRACTION MATERIAL DISPENSING APPARATUS

(76) Inventor: Timothy J. Ahern, Westminster, CO (US)

( * ) Notice: Subject to any disclaimer, the term of this patent is extended or adjusted under 35 U.S.C. 154(b) by 133 days.

(21) Appl. No.: 12/503,568

(22) Filed: Jul. 15, 2009

(51) Int. Cl.
    *B61C 15/00* (2006.01)
(52) U.S. Cl. .................. 291/38; 291/39; 291/48
(58) Field of Classification Search ............ 291/38, 291/39, 40, 18, 19, 20, 21, 22, 23, 24, 41, 291/46, 48
    See application file for complete search history.

(56) References Cited

U.S. PATENT DOCUMENTS

| | | | | |
|---|---|---|---|---|
| 1,734,276 | A | * | 11/1929 | Skolnik et al. .............. 291/23 |
| 1,877,475 | A | * | 9/1932 | Cowan ...................... 291/19 |
| 1,879,747 | A | * | 9/1932 | Hopkins .................... 291/28 |
| 3,827,736 | A | | 8/1974 | Mango |
| 4,316,625 | A | | 2/1982 | Goon et al. |
| 5,100,175 | A | | 3/1992 | Swallow et al. |
| D364,173 | S | | 11/1995 | Woods |
| 2004/0070265 | A1 | | 4/2004 | Sakai et al. |

* cited by examiner

*Primary Examiner* — Mark T Le
(74) *Attorney, Agent, or Firm* — Crossley Patent Law; Mark A. Crossley

(57) ABSTRACT

The traction material dispensing apparatus mounts within the wheel well of a fender of a vehicle and is therefore visually and physically unobtrusive. The apparatus selectively dispenses traction material both in front of and behind a vehicle tire. A driver-accessed switch controls the apparatus dispensing of material. Of importance is that the manifolds, funnels, and nozzles are gravity fed by the vessel so that agitators and pressurized material flow assistance is not needed. Flappers within each manifold are controlled by the driver-actuated switch and control delivery of the traction material to the nozzles. As with the flappers, flow from the nozzles is controlled by a miniature DC (direct current) motor powered by the vehicle's electrical system. Screens ensure breakup of any clumps and therefore proper dispersion of traction material to the roadway.

1 Claim, 6 Drawing Sheets

TRACTION MATERIAL DISPENSING APPARATUS

BACKGROUND OF THE INVENTION

On roads in cold regions, ice and snow often inhibit traction. Severe conditions typically require that tire chains be installed, a laborious process, in both installation and removal. Further, tires chains are often only needed for brief periods, with sufficient traction available before, after, and between such periods. Tires chains also require significant speed reduction. Various devices have been proposed that scatter traction enhancing materials, such as sand, salt, and magnesium chloride, for example. These devices, though, have experienced design and performance flaws. Additionally, some such devices are overly complex and require various forms of delivery enhancement in order to force traction material onto the road surface. The present apparatus provides solutions to the previously experienced problems of obtaining traction.

FIELD OF THE INVENTION

The traction material dispensing apparatus relates to devices for improving vehicle traction and more especially to a traction material dispensing apparatus that conforms to a wheel well shape and dispenses traction material both in front of and behind a vehicle tire.

SUMMARY OF THE INVENTION

The general purpose of the traction material dispensing apparatus, described subsequently in greater detail, is to provide a traction material dispensing apparatus which has many novel features that result in an improved traction material dispensing apparatus which is not anticipated, rendered obvious, suggested, or even implied by prior art, either alone or in combination thereof.

To attain this, the traction material dispensing apparatus mounts within the wheel well of a fender of a vehicle. The apparatus is visually and physically unobtrusive. The apparatus selectively dispenses traction material both in front of and behind a vehicle tire. Traction material may be comprised sand, salt, magnesium chloride, and other traction improving materials often used in inclement weather and poor road conditions. A driver-accessed switch controls the apparatus dispensing of material. The fill neck is mounted atop the apparatus for ease of complete filling of the storage vessel. Of importance is that the manifolds, funnels, and nozzles are gravity fed by the vessel so that agitators and pressurized material flow assistance is not needed. The most basic embodiment includes a DC motor operated pivoting door at a bottom of each nozzle that regulates dispensing of the traction material. With the most complete embodiment, flappers within each manifold are controlled by the driver-actuated switch and control delivery of the traction material to the nozzles. As with the flappers, flow from the nozzles is controlled by a miniature DC (direct current) motor powered by the vehicle's electrical system. Screens ensure breakup of any clumps and therefore proper dispersion of traction material to the roadway.

Thus has been broadly outlined the more important features of the improved traction material dispensing apparatus so that the detailed description thereof that follows may be better understood and in order that the present contribution to the art may be better appreciated.

An object of the traction material dispensing apparatus is to disperse traction-enhancing material in front of a vehicle tire.

Another object of the traction material dispensing apparatus is to disperse traction-enhancing material behind a tire.

A further object of the traction material dispensing apparatus is to dispense traction-enhancing material at a drivers command, optionally during driving.

An added object of the traction material dispensing apparatus is to store the traction enhancing material directly above its dispensing nozzles.

And, an object of the traction material dispensing apparatus is to dispense the traction enhancing material via gravity.

Still another object of the traction material dispensing apparatus is to store and dispense the traction material unobtrusively.

These together with additional objects, features and advantages of the improved traction material dispensing apparatus will be readily apparent to those of ordinary skill in the art upon reading the following detailed description of presently preferred, but nonetheless illustrative, embodiments of the improved traction material dispensing apparatus when taken in conjunction with the accompanying drawings.

In this respect, before explaining the current embodiments of the improved traction material dispensing apparatus in detail, it is to be understood that the traction material dispensing apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved traction material dispensing apparatus. It is therefore important that the claims be regarded as including such equivalent constructions insofar as they do not depart from the spirit and scope of the traction material dispensing apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 5b thereof, the principles and concepts of the traction material dispensing apparatus generally designated by the reference number 10 will be described.

Figure 1:
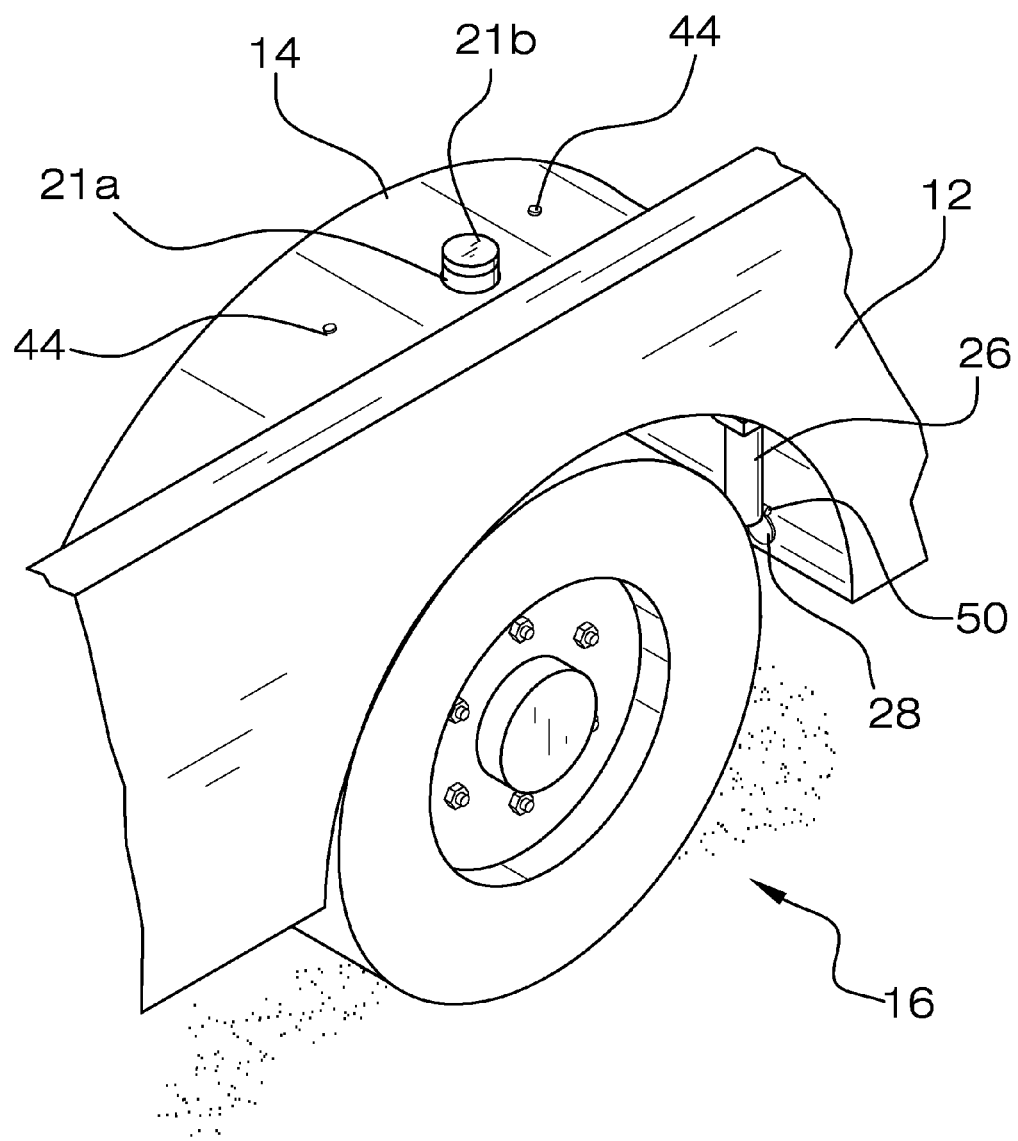
FIG. 1 is a perspective view of the installed apparatus.
Figure 2:
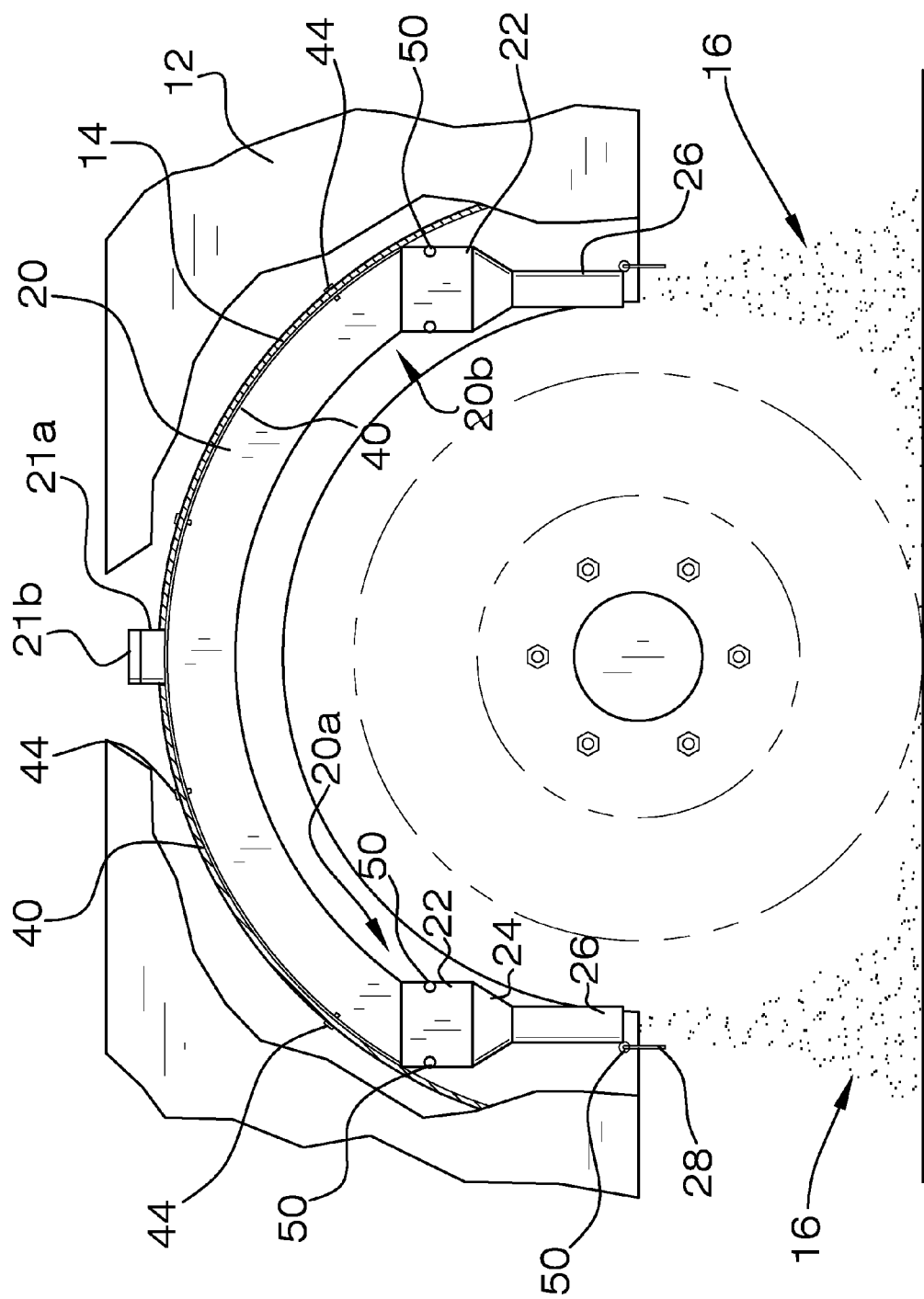
FIG. 2 is a lateral partial cross sectional view of the installed apparatus.
Figure 3:
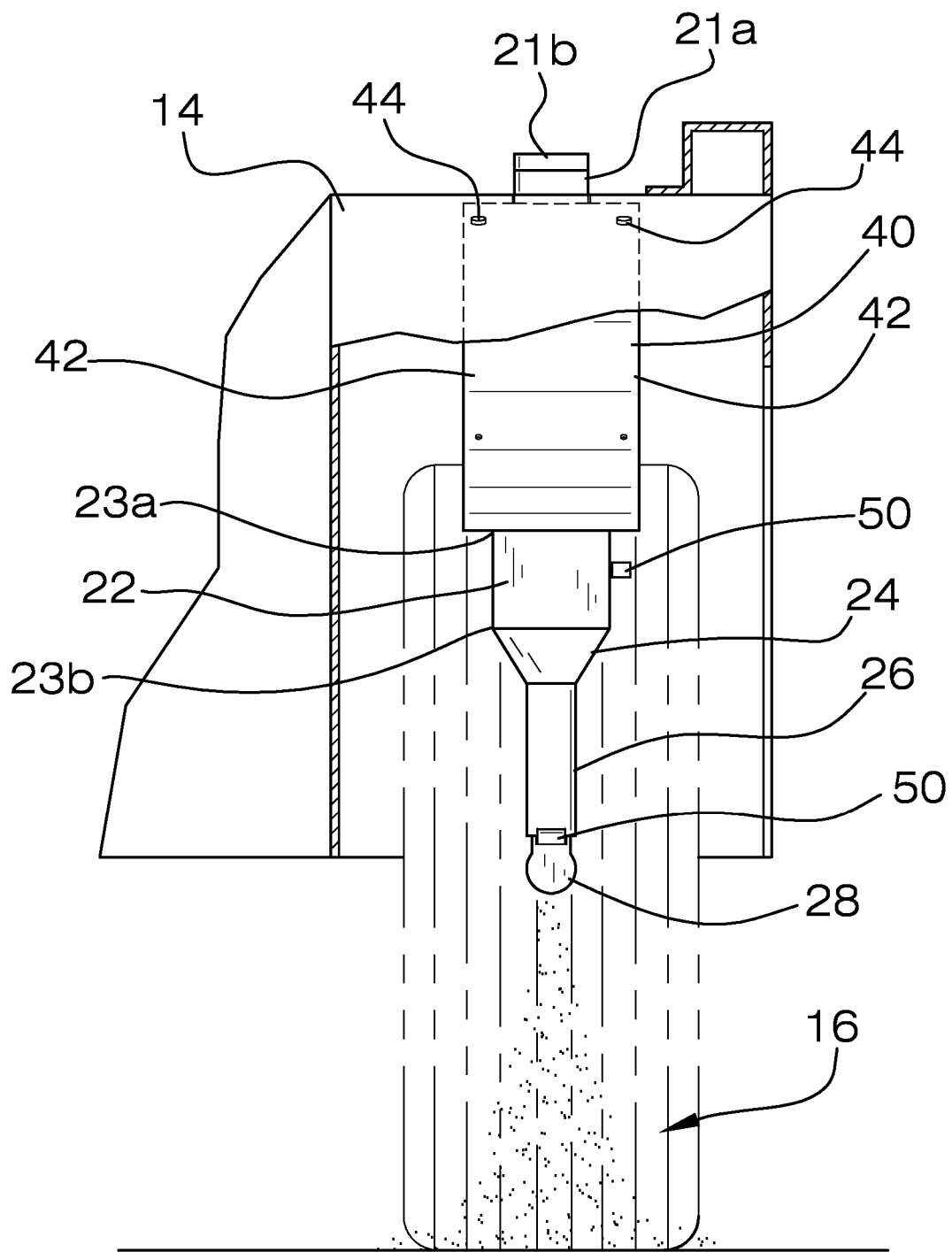
FIG. 3 is a front partial cross sectional view of the installed apparatus.
Figure 4:
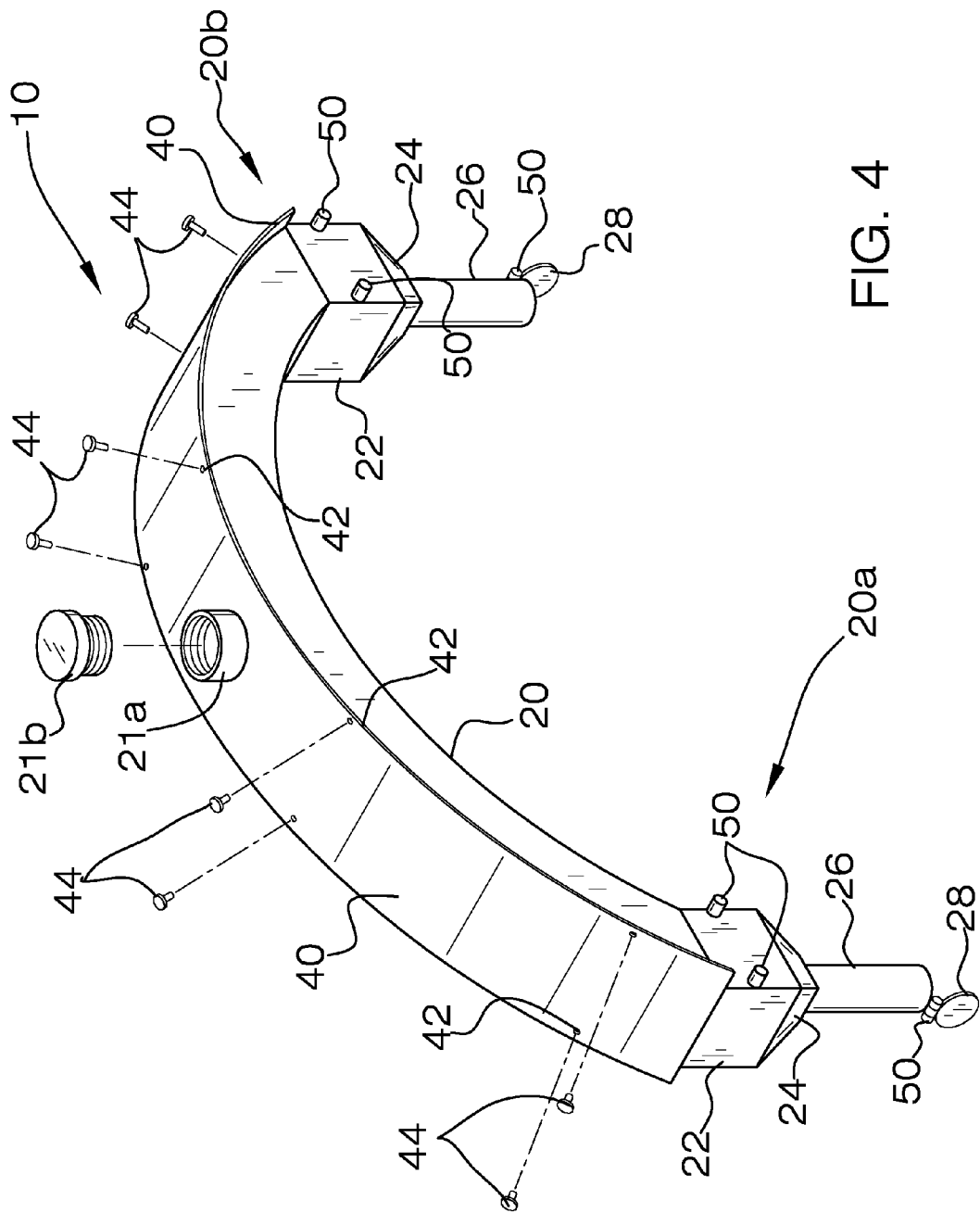
FIG. 4 is a perspective view.

Referring to FIGS. 1, 2, and 4, the apparatus 10 partially comprises the arcuate storage vessel 20 having a first end 20a spaced apart from a second end 20b. The vessel 20 is shaped for fit to an existing vehicle wheel well 14 of an existing fender 12. The apparatus 10 installs above an existing wheel and tire. The arcuate flange 40 is affixed atop the vessel 20. A plurality of spaced apart holes 42 is disposed in the flange 40. Each hole 42 is in receipt of a fastener 44 for fastening the flange 40 to the existing wheel well 14. The fill neck 21a is disposed atop the storage vessel 20. The screw cap 21b is disposed atop the fill neck 21a.

Figure 5A:
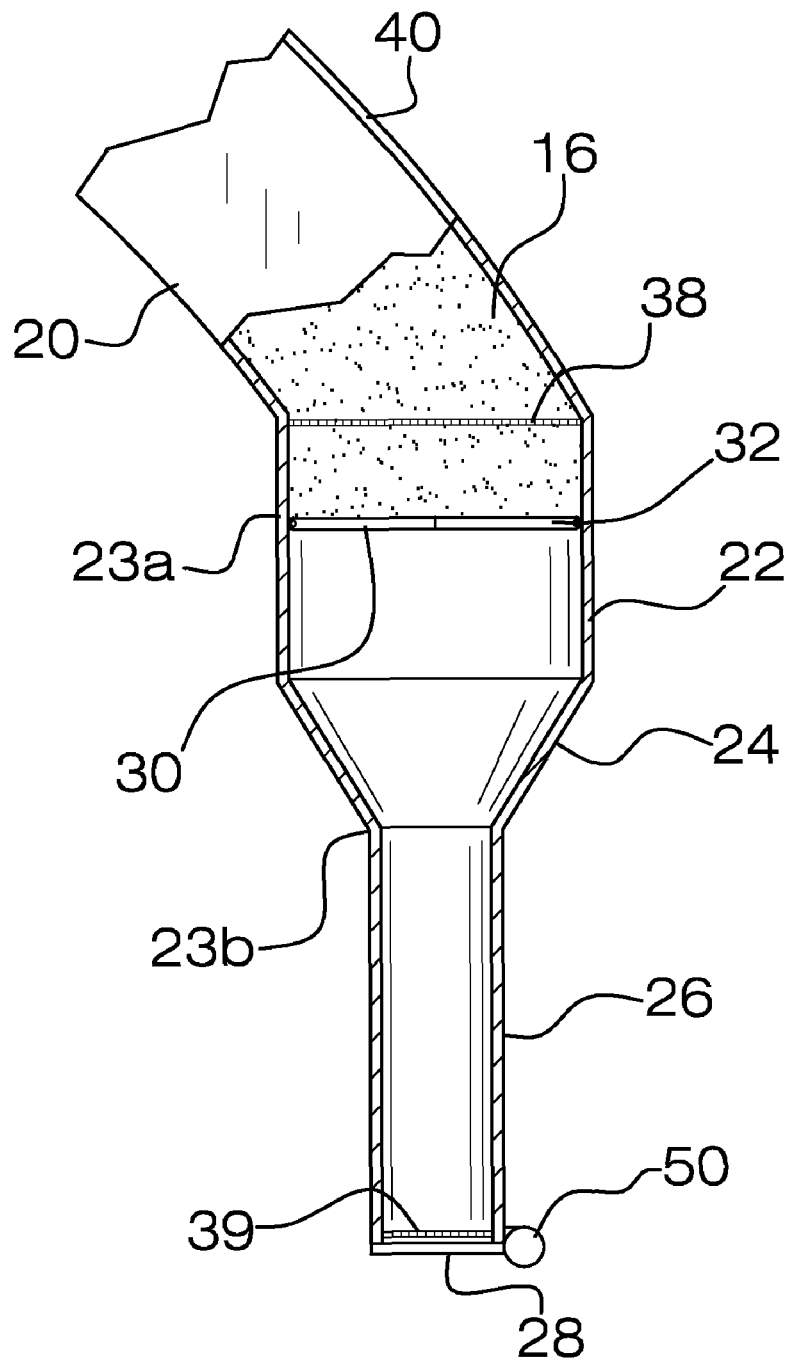
FIG. 5a is a lateral cross sectional view of traction material storage and potential delivery.
Figure 5B:
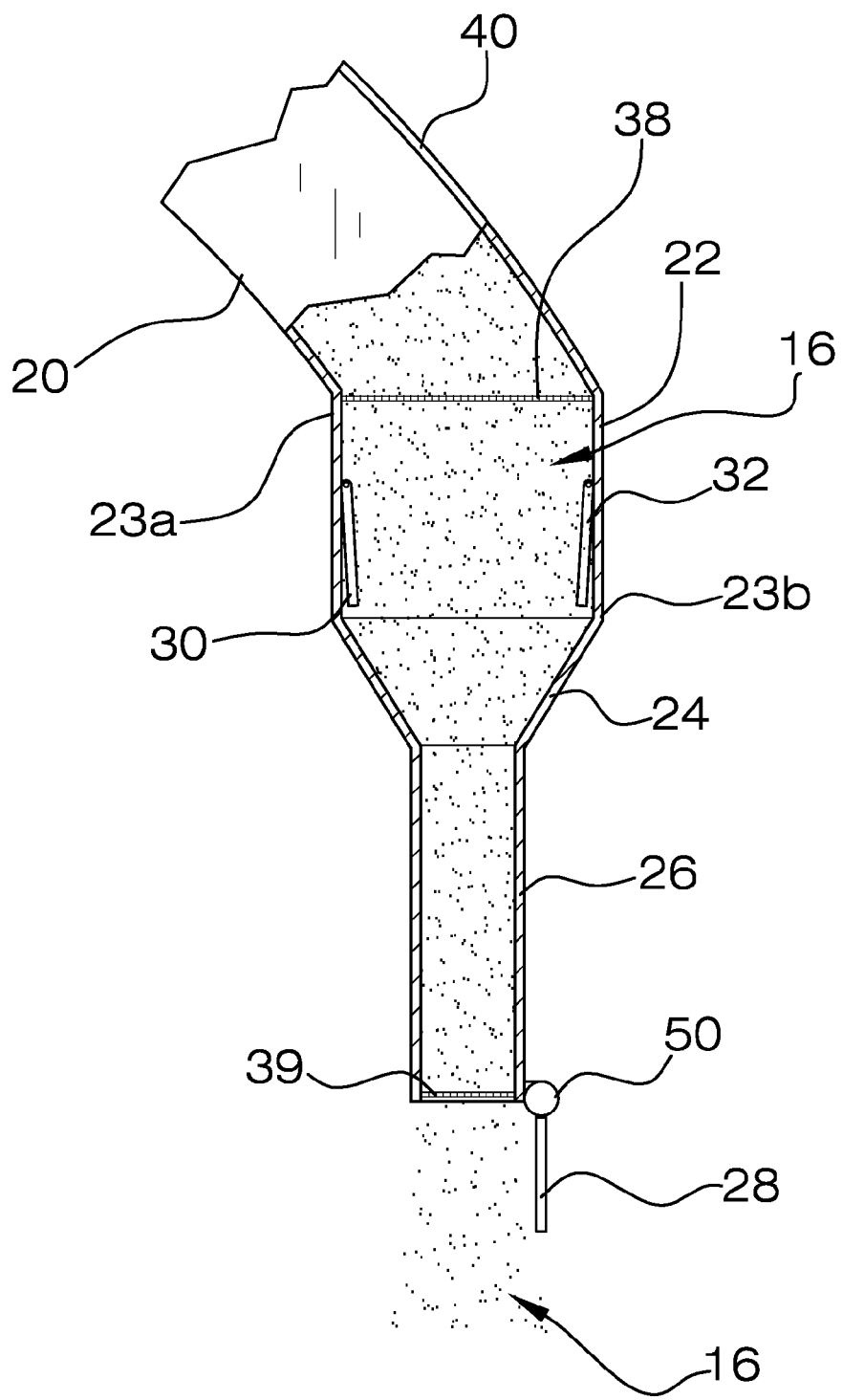
FIG. 5b is a lateral cross sectional view of traction material storage and delivery.

Continuing to refer to FIGS. 2 and 4, and referring also to FIGS. 5a and 5b, a manifold 22 is disposed vertically at each end of the vessel 20. The manifold 22 disposed at the first end 201 of the vessel 20 is identical to the manifold 22 disposed at the second end 20b of the vessel 10. Each tubular funnel structure 22 has a top 23a spaced apart from a bottom 23b. The upper screen 38 is disposed within each tubular funnel structure 22. Each upper screen 38 is disposed at the top 23a. A pair of horizontal downwardly pivoting flappers is disposed within each tubular funnel structure 22 proximal to each upper screen 38. The flappers comprise the first flapper 30 opposite the second flapper 32. The flappers selectively open and close the manifold 22 such that passage of traction material 16 through the tubular funnel structure 22 is selectively regulated.

Referring to FIG. 1 and continuing to refer to FIGS. 2, 3, 5a and 5b, a miniature DC motor 50 operates each flapper. An identical funnel 24 is formed at each bottom 23b. A dispensing nozzle 26 is affixed below each funnel 24. A pivoting door 28 is affixed below each nozzle 26. A miniature DC motor 50 operates each pivoting door 28. A lower screen 29 is disposed within each nozzle 26. The lower screen 39 is adjacent to the pivoting door 28. Both the upper screens 38 and the lower screens 39 ensure that traction material 16 is without clumps and therefore is correctly and widely dispersed for best traction for a vehicle. Of importance is that the apparatus 10 dispenses traction material 16 both in front of and behind vehicle tires. A vehicle therefore has improved traction for both forward and backward movement.

An unexpected result of the apparatus 10 is that vehicles following any vehicle equipped with the apparatus 10 also benefit from improved traction.

The apparatus 10 also includes wiring (not shown) to a switch (not shown) that is fitted as chosen within reach of a vehicle operator. The operator engages the switch when desirous of pivoting door 28 opening via the miniature DC motor 50 attached to the pivoting door 28. The same switch engages the miniature DC motors 50 attached to the first flapper 30 and the second flapper 32.

With respect to the above description then, it is to be realized that the optimum dimensional relationships for the parts of the traction material dispensing apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the traction material dispensing apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the traction material dispensing apparatus may be used.

Therefore, the foregoing is considered as illustrative only of the principles of the traction material dispensing apparatus. Further, since numerous modifications and changes will readily occur to those skilled in the art, it is not desired to limit the traction material dispensing apparatus to the exact construction and operation shown and described, and accordingly, all suitable modifications and equivalents may be resorted to, falling within the scope of the traction material dispensing apparatus.

What is claimed is:

1. A traction material dispensing apparatus, comprising, in combination:
   an arcuate storage vessel having a first end spaced apart from a second end, the vessel shaped for fit to an existing vehicle wheel well, above an existing wheel and tire, the first end disposed in front of the wheel and tire, the second end disposed behind the wheel and tire;
   an arcuate flange affixed atop the vessel;
   a plurality of spaced apart holes in the flange, each hole in receipt of a fastener for fastening the flange to the existing wheel well;
   a fill neck disposed atop the storage vessel;
   a screw cap disposed atop the fill neck;
   an identical tubular funnel structure disposed vertically at each end of the vessel, each said tubular funnel structure having a top spaced apart from a bottom;
   an upper screen within each said tubular funnel structure, the upper screen disposed at the top;
   a pair of horizontal downwardly pivoting flappers disposed within each said tubular funnel structure proximal to each said upper screen, the flappers comprising a first flapper opposite a second flapper, the flappers selectively opening and closing the tubular funnel structure;
   a miniature DC motor operating each said flapper;
   an identical funnel formed at each said bottom;
   a dispensing nozzle affixed below each said funnel;
   a pivoting door affixed below each said nozzle;
   a miniature DC motor operating each said pivoting door;
   a lower screen disposed within each said nozzle, the lower screen adjacent to the pivoting door; whereby traction material is selectively dispensed both in front of and behind the vehicle wheel and tire.

\* \* \* \* \*